United States Patent
Bhandari et al.

(10) Patent No.: US 7,801,245 B2
(45) Date of Patent: Sep. 21, 2010

(54) INCREASED RELIABILITY OF DATA CAPTURES FOR SIGNAL PREDISTORTION

(75) Inventors: Rajan Bhandari, Newbury (GB); Stephen Summerfield, Weybridge (GB); Alan Barry Christie, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 875 days.

(21) Appl. No.: 11/617,133

(22) Filed: Dec. 28, 2006

(65) Prior Publication Data

US 2008/0157819 A1    Jul. 3, 2008

(51) Int. Cl.
*H04L 25/49* (2006.01)
*H04B 1/04* (2006.01)

(52) U.S. Cl. .................... 375/296; 455/114.3
(58) Field of Classification Search ................ 375/285, 375/295–297; 455/114.2, 114.3, 115.1
See application file for complete search history.

(56) References Cited

U.S. PATENT DOCUMENTS

| | | | | |
|---|---|---|---|---|
| 5,638,403 A | * | 6/1997 | Birchler et al. | ............. 375/296 |
| 6,570,933 B1 | * | 5/2003 | Makinen | ...................... 375/296 |
| 7,479,828 B2 | * | 1/2009 | Benedict | ...................... 330/149 |
| 2003/0031270 A1 | * | 2/2003 | Giardina et al. | ............. 375/296 |
| 2003/0063686 A1 | * | 4/2003 | Giardina et al. | ............. 375/296 |
| 2007/0109047 A1 | * | 5/2007 | Benedict et al. | ............. 330/149 |

* cited by examiner

*Primary Examiner*—Khanh C Tran
(74) *Attorney, Agent, or Firm*—Carlson, Gaskey & Olds, P.C.

(57) ABSTRACT

Determining a predistortion function includes sampling a signal to obtain a plurality of capture sets within a single sampling window. Each of the capture sets is analyzed to determine whether it satisfies preselected criteria. Example criteria include desired characteristics of a capture set average power, capture set peak power and a number of peaks within a capture set. If any capture set within the sampling window satisfies all of the preselected criteria and has the highest number of peaks, that capture set will be used for determining a predistortion function. A multiple capture set selection module applies the preselected criteria for selecting an appropriate capture set for determining the predistortion function. The predistortion function is used for applying predistortion to a signal before that signal is processed by a distorting component that introduces distortion so that the predistortion can compensate for or cancel out such distortion.

20 Claims, 1 Drawing Sheet

INCREASED RELIABILITY OF DATA CAPTURES FOR SIGNAL PREDISTORTION

TECHNICAL FIELD

This invention generally relates to communication. More particularly, this invention relates to predistortion use for communication signal processing.

DESCRIPTION OF THE RELATED ART

Nonlinear components such as amplifiers along a wireless communication transmitter path tend to introduce various forms of distortion. One technique for compensating for or cancelling out any such distortion includes adding a distortion component to the transmitted signal. Such an added component is typically introduced in a transmit path prior to the component responsible for the distortion. Accordingly, such techniques are commonly referred to as predistortion.

The compensating predistortion component may be added in a digital domain or an analog domain. Analog predistortion performance is limited because it is not variable once set for a component and therefore has an associated cost that is tied to the cost of radio frequency components. It is generally considered advantageous to include a predistortion function in a digital domain so that it can be shared over several components such as amplifiers. Additionally, predistortion functions in the digital domain have an associated cost tied to the less expensive cost of digital processing.

Various methods for calculating a predistortion function are known. One commonly used approach includes a sampled data digital predistortion system. This approach includes a feedback path from a distorting component output so that the output from the distorting component and the desired transmitted signal can be compared. An appropriate predistortion function is based upon the comparison and applied digitally to the transmitted signal. There are well known techniques for determining such predistortion functions.

In some approaches the predistortion function is calculated during transmission of a specially designed training signal. One advantage to using such a training signal is that it can be stepped to specific power levels and can introduce a specific amount of noise. The sampled signals therefore tend to provide reliable information for determining a predistortion function. A disadvantage associated with such a test signal is that it is not desirable to introduce such power and noise levels into a system that is being used for live wireless communications. It is necessary to periodically update a predistortion function to compensate for component aging and temperature or other drift effects so something typically is done on an ongoing basis.

One approach includes sampling existing conditions such as transmitted signals used during actual communications. Such signals can vary in different manners (e.g., power level) such that the data samples may not be useful or desirable for deriving coefficients to be used in a predistortion function. In some instances, it is not possible to sample enough data to reliably update a predistortion function.

The coefficients required to achieve good linearity will depend on factors that change with time. These may include environmental, with temperature being most significant, or signal conditions. For mobile communications, the instantaneous signal changes at a rate dependent on the channel bandwidth. Additionally, there are power envelopes within a range of time scales from tens of microseconds up to many seconds. Additionally, spectral content and signal statistics may vary. In general, for acceptable performance, the predistortion function has to track such changes. Therefore, the coefficients that are applied need to change with time. Therefore, the periodic updates are required.

The rate at which the coefficients need to be updated is related to fundamental time constants for the predistortion function. These will in general depend on the amplifier or other component that introduces the distortion and the nature of the signal. In principal, the time constant reflects the scale over which the average signal condition should guide the evolution of the predistortion coefficients. In general, time constants lie in the range from 50 milliseconds to 5 seconds. These time constants depend on amplifier technology and a latency of environmental conditions.

Updating the coefficients at a required rate through repeated signal sampling (e.g., capture) and estimation may require considerable processing resources in many examples. Some approaches include using stored tables for various signal conditions that may be encountered.

The performance of a given system may be poor when random signal samples are taken of a signal that contain variations of duration comparable to capture length (e.g., hundreds of microseconds) and shorter than the average power length. This is because a capture (e.g., a set of samples) may not contain sufficient information about the signal for accurate estimation for the range of signals over the time constant.

For example, when a signal power envelope varies between relatively high and low levels and a sample is taken during a low period, the signal swing is not representative of the signal during the high power period. An estimation algorithm based on a low power capture cannot fit a function that works during a high power period because it has not been presented with any information to account for the distorting component (e.g., amplifier) behavior at that time. In contrast, a predistortion function estimated from data captured during a high power period is typically reliable.

There is a need for an improved technique to ensure that reliable captures of signal samples are obtained for a predistortion function.

SUMMARY OF THE INVENTION

An exemplary method of controlling signal distortion includes sampling a signal a plurality of times within a sampling window to obtain a plurality of successive capture sets each comprising a plurality of signal samples. Each of the capture sets corresponds to a state of a distorting component during the same sampling window. A determination is made whether any of the capture sets satisfies preselected criteria. A predistortion function is determined based on at least one of the capture sets that is determined to satisfy the criteria.

An exemplary device for controlling signal distortion includes a sampling module that samples a signal a plurality of times within a sampling window to obtain a plurality of capture sets each comprising a plurality of signal samples. Each of the capture sets corresponds to a state of a distorting component during the same sampling window. A capture selection module determines whether any of the capture sets satisfies preselected criteria. A predistortion function determining module determines a predistortion function based on at least one of the capture sets that does satisfy the criteria.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

A disclosed example includes obtaining many distinct capture sets in succession within a sampling window and then applying selection criteria to the sets of captures to locate one that meets statistical requirements for a reliable predistortion function. The disclosed technique allows for obtaining many captures within one time constant or sampling window such that all of the captures are relative to the same state of a component of interest.

Figure 1:
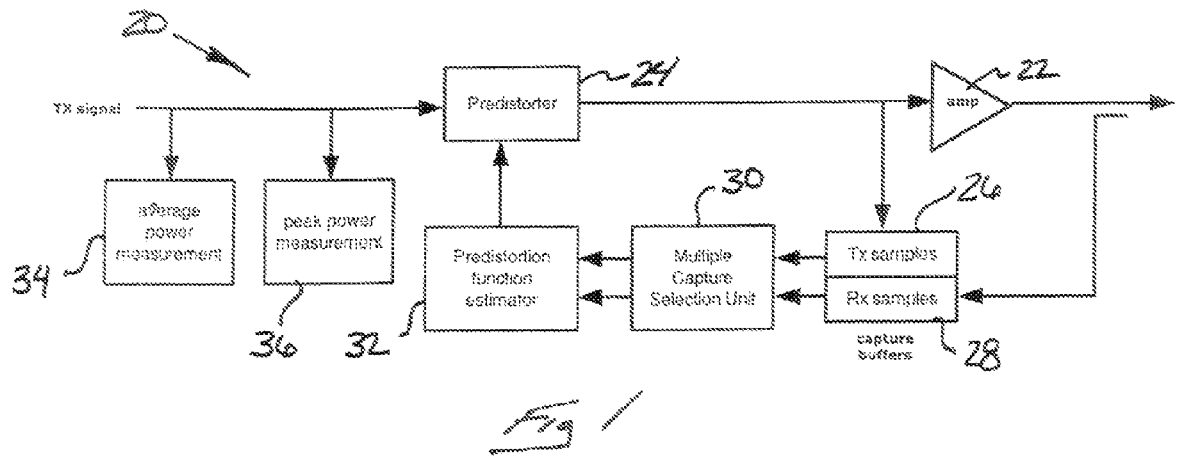
FIG. 1 schematically illustrates an example transmission device that represents an example embodiment of this invention.

A signal processing device 20 is schematically shown in FIG. 1 including an amplifier 22. In the illustrated example, the device 20 is used for transmitting signals. The amplifier 22 is a component that tends to introduce distortion into a transmitted signal. Such a component is referred to as a distorting component in this description. A predistorter module 24 introduces predistortion into a transmitted signal before the signal reaches the amplifier 22. The predistortion is intended to compensate for or cancel out the distortion that will be introduced by the amplifier 22 such that the resulting transmitted signal corresponds to a desired signal.

The example of FIG. 1 includes sampling buffers 26 and 28 that are used for obtaining samples of signals to indicate an amount of distortion present in the signal. In the illustrated example, the buffer 26 obtains samples of the transmit signal prior to encountering the amplifier 22. The buffer 28 obtains samples of the signal after it has been processed by the amplifier 22 (e.g., a feedback sample). In some examples, the buffer 26 is referred to as a transmit sample buffer while the buffer 28 is referred to as a receive sample buffer.

Information from the sample buffers 26 and 28 is used for determining a predistortion function. In the illustrated example, a multiple capture selection module 30 processes a plurality of capture sets that are all obtained within a single sampling window (e.g., one time constant). The multiple capture selection module 30 determines whether any one of a plurality of capture sets from within a sampling window corresponding to a single state of the amplifier 22 satisfies preselected criteria that indicate whether the data within a capture set is useful for determining the predistortion function. The illustrated example includes a predistortion function estimator module 32 that utilizes information from an acceptable capture set for determining a predistortion function in a known manner. The predistorter module 24 uses the information from the predistortion function estimator 32 for applying predistortion to a transmission signal.

The example of FIG. 1 includes an average power measurement module 34 that determines an average power of the transmitted signal in a known manner. A peak power measurement module 36 determines a statistical peak power that corresponds to the power level that occurs with some defined probability within the measurement interval or sampling window. In one example, a $10^{-4}$ probability is used. The statistical peak power is used in one example because it is more robust than looking at a single, absolute peak.

The various modules are schematically divided for discussion purposes. One or more functions of any one of them may be performed, at least in part, by another. Some examples will integrate various such modules into a single device or a single processor. The multiple capture selection module 30 of the disclosed examples can be realized through software, hardware, firmware or a combination of these. Those skilled in the art who have the benefit of this description will be able to configure appropriate components and to select appropriate criteria to meet their particular needs.

The multiple capture selection module 30 considers a plurality of capture sets that are all from within a sampling window or measuring time constant that corresponds to a single state of the amplifier 22. This is different than obtaining a single capture set within a sampling window, performing some analysis to determine whether that is reliable and then, if applicable, applying it to a predistortion function. In the disclosed example, a plurality of capture sets are obtained within a sampling window and all of them are considered for determining if any of them contain data that is useful for a reliable predistortion function.

One advantage to this approach is that obtaining multiple captures for the illustrated example only introduces some additional memory and hardware or software, depending on the particular application. Obtaining multiple capture sets in succession within a single sampling window can occur relatively quickly. On the other hand, testing a single data set to determine whether it is useful before obtaining another capture set in a later sampling window introduces delays such that a capture set that eventually becomes used may not correspond to the amplifier state by the time the corresponding predistortion function is implemented. Prior to the disclosed example approach, it often took longer to process the capture set than the time constant of a corresponding predistortion function. Thus, when a subsequent capture was taken, it did not necessarily refer to the same distorting component state. With the disclosed approach, however, all of the capture sets are from within a single sampling window and, therefore, they all refer to the same component state.

Figure 2:
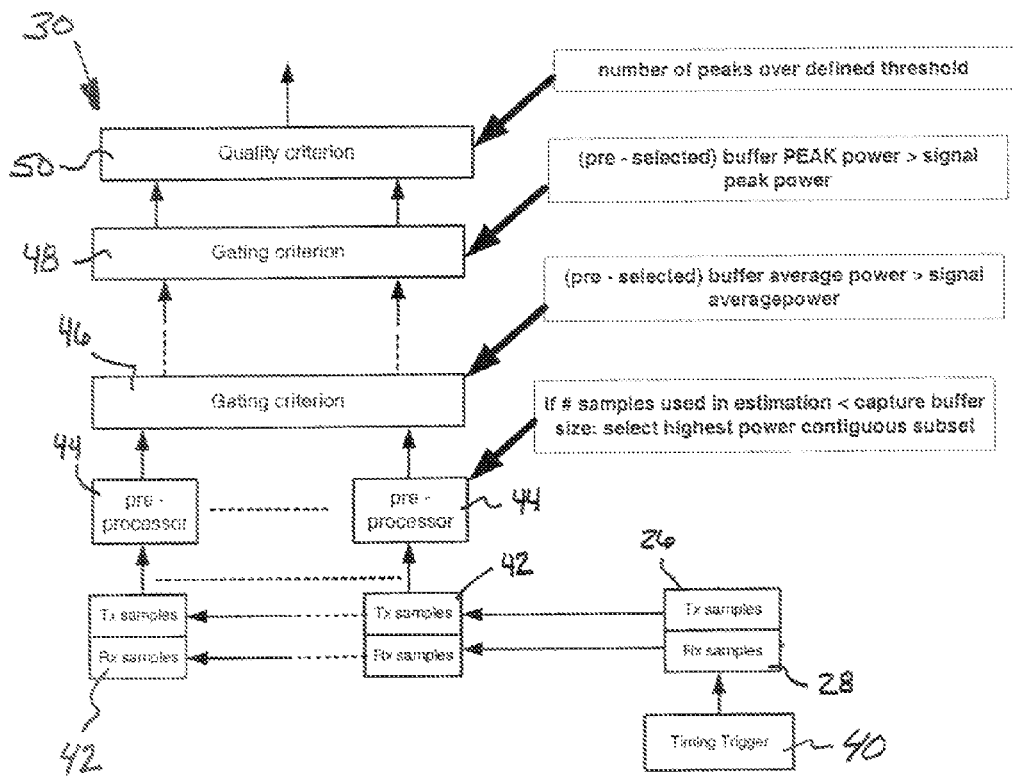
FIG. 2 schematically illustrates an example capture selection module designed according to an embodiment of this invention.

FIG. 2 schematically illustrates the operation of one example multiple capture selection module 30.

In this example, a plurality of signal samples from the buffers 26 and 28 are contained within each of a plurality of capture sets. A timing trigger 40 establishes the length of time of the sampling window or time constant used for controlling how many signal samples are obtained within the buffers 26 and 28. The timing trigger 40 makes that a time to meet the needs of a particular situation. Given this description, those skilled in the art will be able to select an appropriate way of managing the size of a sampling window to meet their particular needs.

Each of the capture sets is placed within an individual buffer 42. Each capture set includes a plurality of signal samples. In some instances, a capture set will include thousands or tens of thousands of signal samples.

The illustrated example includes preprocessor modules 44 that process each capture set prior to applying selected criteria that are used for determining whether a capture set will be used for the predistortion function. In this example, each preprocessor module 44 determines a size of the capture set. If the amount of data in the buffer 42 corresponding to a capture set exceeds the amount required for formulating the predistortion function or coefficients, then the preprocessor 44 selects a portion of the capture set to be forwarded on for further processing. In one example, each preprocessor module 44 selects a highest power, contiguous subset of sample blocks from within the corresponding buffer 42 such that the amount of data forwarded for further processing corresponds to the amount required for determining the predistortion function. In one example, the capture buffer size M is divided into a plurality B of sample blocks. The preprocessor modules 44 determine the average power in each sample block. Where the estimation buffer for determining the predistortion function has a size L, L contiguous blocks of the B sample blocks are selected for further processing. One example includes starting the selection at a block having a position corresponding to a maximum value of (M−L)/B sums of (L/B) powers within the corresponding buffer 42.

In one example only the transmit buffer data from the corresponding buffer 42 needs to be examined for determining whether a capture set meets the preselected criteria. Determining whether a capture set meets the criteria in the illustrated example includes processing each capture set through a plurality of gating modules.

Using a set of gating criteria that involves more than just looking at an average power of a capture set provides an ability to select a capture set corresponding to conditions that will provide better predistortion function determinations. For example, gating criteria based upon peak power and a number of peaks within a capture set provide information regarding an ability to excite the amplifier into a condition that is best for predistortion.

This example includes a gating module 46 that determines whether an average power of a capture set has a desired relationship with the average power of the signal as determined by the average power measurement module 34 in FIG. 1, for example. One example includes requiring that the average power within the capture set is greater than the signal average power. In one example, whenever the average power of the capture set is within a selected range or a defined tolerance of the signal average power, that capture set is considered acceptable as a possible candidate for use in determining the predistortion function. Acceptable capture sets move on for further analysis. Those that do not have sufficient average power are discarded or deleted (e.g., the corresponding data from the corresponding buffer 42 is deleted or ignored).

Another gating module 48 makes a determination whether the peak power of a capture set has a desired relationship with the signal peak power as determined by the peak power measurement module 36, for example. One example includes requiring that the peak power of the capture set exceed the signal peak power. One example includes determining whether the peak power is within an established range or a defined tolerance of the signal peak power. Whenever the desired relationship between the capture set peak power and the signal peak power exists, that capture set is considered acceptable as a candidate for determining the predistortion function.

In one example, the peak power of each capture set that is considered is the statistical peak power, which is the power level that occurs within a defined probability within the measurement interval, for example $10^{-4}$ probability. The statistical peak power is used in one example to provide a more robust arrangement compared to one that utilizes a single absolute peak.

A quality criteria module 50 determines a number of peaks in each capture set that has satisfied the requirements of the gating modules 46 and 48. In one example, the quality criteria module 50 determines whether the number of peaks in each capture set exceeds a selected threshold. In one example, the threshold comprises a programmable function of the average signal power. One example function includes a constant multiplying the average signal power. The capture set that has the maximum number of peaks exceeding the threshold is selected as the capture set for determining the predistortion function. If none of the capture sets have a number of peaks that exceed the threshold, the next sampling window set of capture sets will be considered before the predistortion function is updated.

The example technique includes applying the criteria of the modules 46-50 and the operation of the preprocessor modules 44 within a power averaging time constant. Analyzing a plurality of capture sets within such a time period ensures that all candidate capture sets are relevant to the same average power condition of the amplifier 22 or another distorting component of interest. Each of the gating modules 46 and 48 will forward one or more capture sets for further processing. The quality criteria module 50 will only pass one, or none, to the predistortion function estimator module 32 for determining the predistortion function that is then applied to a transmitted signal.

One example includes continuously repeating captures for measuring the stability of the amplifier gain. This approach can be used as a gating criteria for estimation if there is evidence to suggest that estimation performed on captures taken while the gain is varying beyond some defined threshold is less desirable than otherwise. The gain of the amplifier in one example is considered to be the ratio of the powers in the buffers 26 and 28 or corresponding portions of the buffers 42, for example. One example criteria includes requiring that the gain over a capture set must be within a selected range. Another example includes requiring that the gain over a period spanning a number of capture sets (e.g., over the power average time constant) should be within a desired range. Either or both of these criteria are implemented in one example through a gating module such as the example modules 46 and 48 of FIG. 2.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling signal distortion, comprising:
   sampling a signal a plurality of times within a sampling window to obtain a plurality of successive capture sets each comprising a plurality of signal samples from within the sampling window such that each capture set corresponds to a distorting component state during the same sampling window;
   determining whether any of the successive capture sets satisfies preselected criteria; and
   determining a predistortion function based on at least one of the capture sets determined to satisfy the criteria.

2. The method of claim 1, comprising
   determining if a size M of a candidate capture set is larger than a size L required for determining the predistortion function; and
   selecting a portion of the candidate capture set corresponding to a maximum power such that the portion has the size L.

3. The method of claim 2, comprising
   dividing the candidate capture set into a plurality B of sample blocks;
   determining an average power of each sample block;

selecting L contiguous ones of the B sample blocks beginning with a sample block corresponding to a maximum power.

4. The method of claim 3, comprising determining the beginning sample block by determining (M−L)/B sums of (L/B) powers.

5. The method of claim 1, wherein the preselected criteria includes a selected relationship between an average power of a capture set and an average power of the signal, the method comprising
determining an average power of each capture set;
rejecting any capture set having an average power that is outside of a selected range of the average power of the signal.

6. The method of claim 5, wherein the desired relationship includes the average power of the capture set exceeding the average power of the signal.

7. The method of claim 1, wherein the preselected criteria includes a desired relationship between a peak power of a capture set and a peak power of the signal, the method comprising
determining a peak power of each capture set; and
rejecting any capture set having a peak power that is outside of the selected range of a peak power of the signal.

8. The method of claim 7, wherein the desired relationship includes the peak power of the capture set exceeding the peak power of the signal.

9. The method of claim 1, wherein the preselected criteria includes a number of peaks in a capture set exceeding a threshold, the method comprising determining a number of peaks in each capture set; and
rejecting any capture set having a number of peaks that is below the threshold.

10. The method of claim 9, comprising selecting a capture set having the highest number of peaks exceeding the threshold for determining the predistortion function.

11. The method of claim 1, comprising determining a ratio of power associated with sampled signals obtained prior to the distorting component and power associated with obtained signal samples that have been processed by the distorting component; and
rejecting any capture set if the determined ratio over a corresponding capture set is outside of a desired range.

12. The method of claim 11, comprising
rejecting any capture set within a period spanning a number of the capture sets if the ratio over the number of capture sets is outside of a desired range.

13. The method of claim 1, comprising
applying the determined predistortion function to a signal; and
transmitting the signal.

14. A device for controlling signal distortion, comprising:
a multiple capture selection module configured to determine whether any of a plurality of successive capture sets satisfies preselected criteria, wherein the plurality of successive capture sets each comprise a plurality of signal samples from within a sampling window such that each capture set corresponds to a distorting component state during the same sampling window; and
a predistortion function module configured to determine a predistortion function based on at least one of the capture sets determined to satisfy the criteria.

15. The device of claim 14, wherein the multiple capture selection module is configured to
determine if a size M of a candidate capture set is larger than a size L required for determining the predistortion function; and
select a portion of the candidate capture set corresponding to a maximum power such that the portion has the size L.

16. The device of claim 14, wherein the preselected criteria includes a selected relationship between an average power of a capture set and an average power of the signal and the multiple capture selection module is configured to
determine an average power of each capture set;
reject any capture set having an average power that is outside of a selected range of the average power of the signal.

17. The device of claim 14, wherein the preselected criteria includes a desired relationship between a peak power of a capture set and a peak power of the signal and the multiple capture selection module is configured to
determine a peak power of each capture set; and
reject any capture set having a peak power that is outside of the selected range of a peak power of the signal.

18. The device of claim 14, wherein the preselected criteria includes a number of peaks in a capture set exceeding a threshold and the multiple capture selection module is configured to
determine a number of peaks in each capture set; and
reject any capture set having a number of peaks that is below the threshold.

19. The device of claim 14, wherein the multiple capture selection module is configured to select a capture set having the highest number of peaks exceeding the threshold.

20. The device of claim 14, wherein the multiple capture selection module is configured to
determine a ratio of power associated with sampled signals obtained prior to the distorting component and power associated with obtained signal samples that have been processed by the distorting component; and
reject any capture set if the determined ratio is outside of a desired range.

* * * * *